June 7, 1932.  M. C. T. LEWIS  1,862,057
CONDIMENT SHAKER
Filed March 10, 1931  2 Sheets-Sheet 1
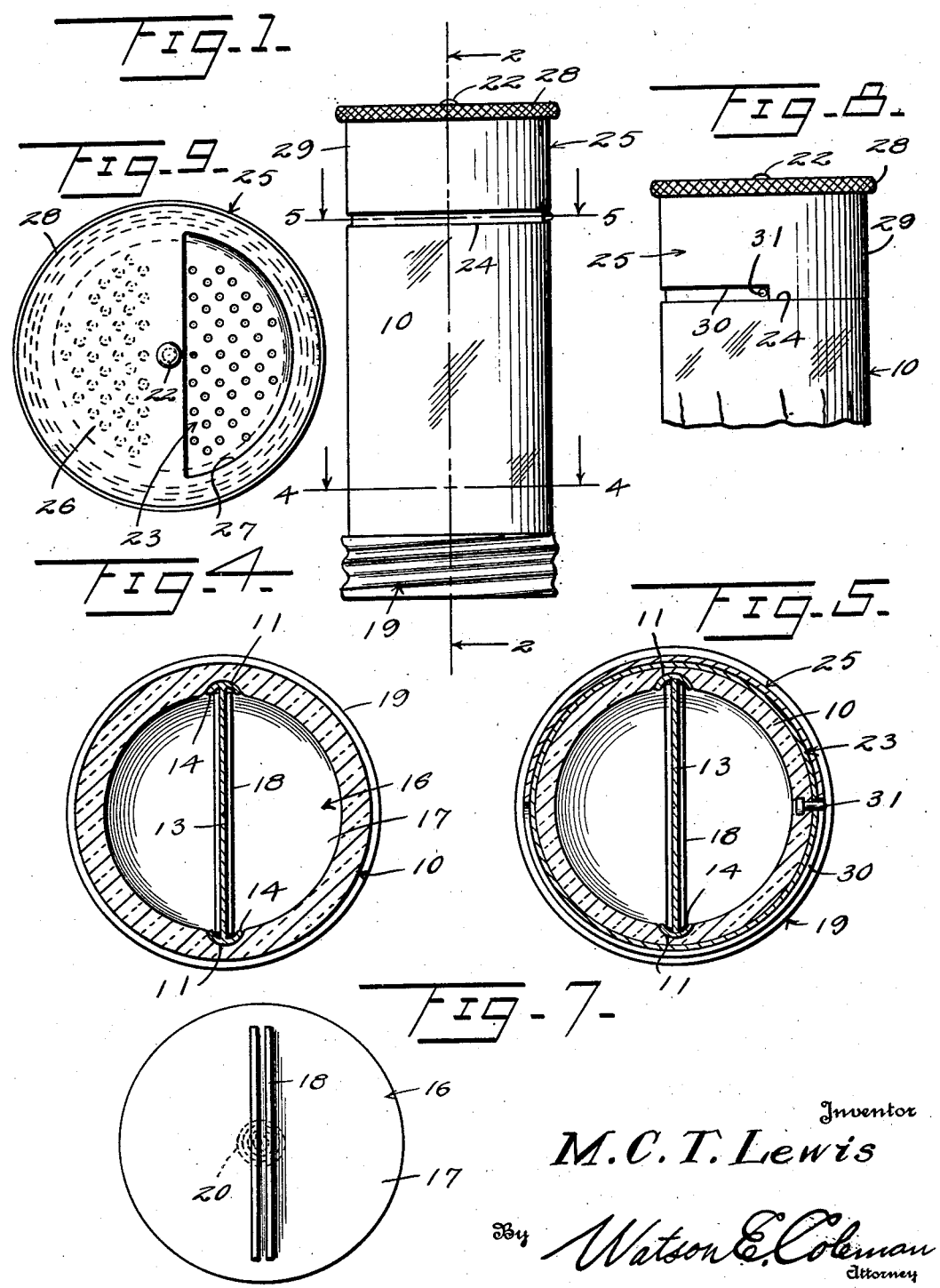

June 7, 1932.  M. C. T. LEWIS  1,862,057
CONDIMENT SHAKER
Filed March 10, 1931  2 Sheets-Sheet 2
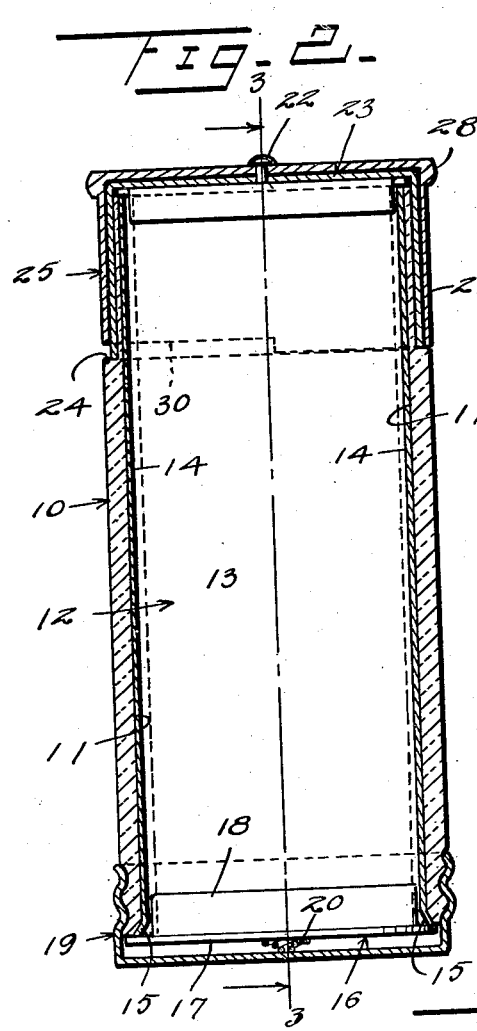
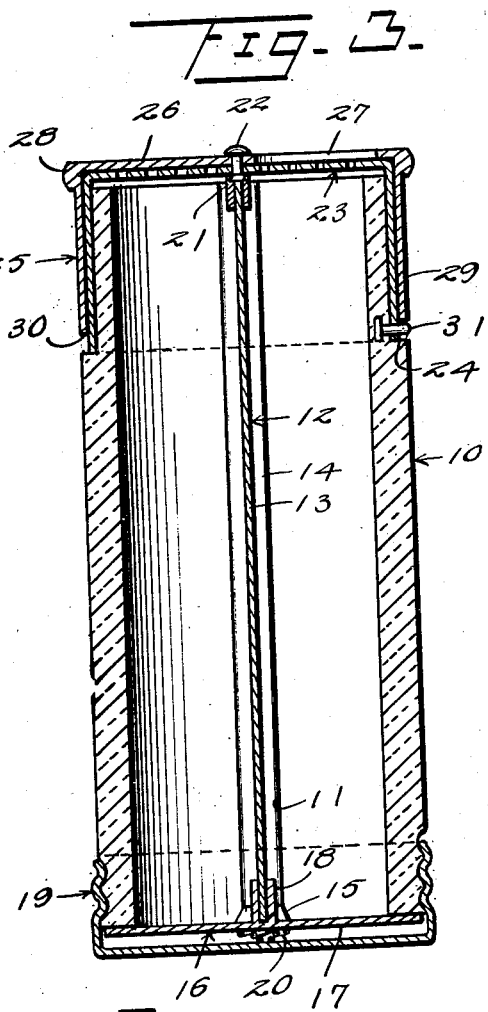
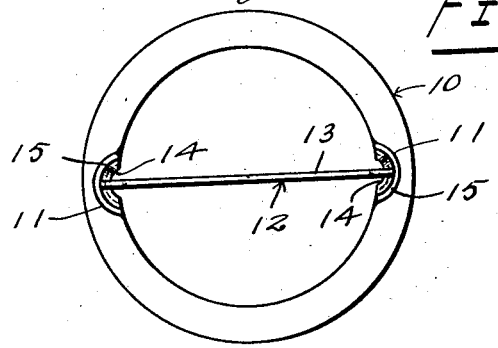
Inventor
M.C.T.Lewis
By Watson E. Coleman
Attorney Patented June 7, 1932

1,862,057

UNITED STATES PATENT OFFICE

MILES C. T. LEWIS, OF CALISTOGA, CALIFORNIA

CONDIMENT SHAKER

Application filed March 10, 1931. Serial No. 521,531.

This invention relates to condiment shakers, and more particularly to a shaker of this kind which is adapted to receive several kinds of condiments for selective discharge therefrom.

An object of this invention is to provide a shaker of this kind which is so constructed that the contents thereof will not be mixed upon shaking or agitating of the device.

Another object of this invention is to provide a shaker having means whereby the contents may be readily replaced.

A further object of this invention is to provide a device of this kind which is readily cleaned and which can be readily assembled within a glass or porcelain receptacle.

The above and various other objects and advantages of this invention will in part be described in and in part be understood from the following detailed description of the present preferred embodiment, the same being illustrated in the accompanying drawings, wherein:—

Figure 1 is a detail side elevation of a device constructed according to the preferred embodiment of this invention;

Figure 2 is a longitudinal sectional view taken on the line 2—2 of Figure 1;

Figure 3 is a similar view taken on the line 3—3 of Figure 2;

Figure 4 is a sectional view taken on the line 4—4 of Figure 1;

Figure 5 is a similar view taken on the line 5—5 of Figure 1;

Figure 6 is a bottom plan view with the cap and closure removed from the device;

Figure 7 is a top plan view of the inner closure member;

Figure 8 is a fragmentary side elevation of the upper portion of the device, and Figure 9 is a top plan view of the device.

Referring to the drawings wherein like numerals of reference designate corresponding parts throughout the several views, the numeral 10 designates generally a receptacle of cylindrical construction which is open at each end and provided with a pair of longitudinally disposed and diametrically opposed grooves 11 therethrough, the purpose for which will be hereinafter described.

A partition member, generally designated as 12, is adapted to be mounted within the receptacle 10 so as to divide the receptacle into a plurality of condiment chambers, this partition 12 comprising an elongated plate 13 which is provided at each edge thereof with segmental members 14 which extend substantially throughout the length of the plate 13, these segmental members 14 being mounted in the grooves 11 of the cylindrical receptacle 10. The segmental members 14 may be secured within the receptacle 10 against movement by means of cementitious material or the like. The lower ends of the members 14 are preferably flared outwardly, as at 15, which flared portions 15 are adapted to engage against the bottom of the receptacle 10 so as to cooperate with the cementitious material in holding the plate 13 against longitudinal movement within the receptacle 10.

A removable closure member generally designated as 16 engages against the bottom of the receptacle 10 and against the lower end of the plate 13 so as to close the lower end of the receptacle 10 and prevent mixing of the contents of each compartment within the receptacle. This closure member 16 comprises a disc-like plate member 17 which is provided with spaced arms 18 extending diametrically across one face of the disc 17, these arms 18 frictionally engaging the opposite sides of the plate 13 adjacent the lower end thereof so as to frictionally hold the plate 17 in position at the lower end of the receptacle 10.

A cap member 19 is threadably mounted on the lower end of the receptacle 10, this cap engaging the periphery of the receptacle and the plate 17 is provided at the outer face thereof with a spring or resilient member 20 which is placed under tension when the cap 19 is mounted on the receptacle so that the closure 16 will be resiliently and frictionally held on the lower end of the receptacle 10. In this manner, even though the cap 19 becomes loosened, the plate 17 will be resiliently held against the lower end of the receptacle 10 so as to close this lower end and prevent mixing of the contents of the shaker.

At the upper or discharge end of the receptacle 10 the plate 13 is provided with a U-shaped bar or member 21 which extends across the upper or discharge end of the plate 13, and the upper face of the member 21 is mounted flush with the top of the segmental members 13. The bar member 21 has an upstanding pin 22 substantially centrally thereof and an apertured cap 23 is adapted to be mounted on the upper face of the bar 21, being held against rotation with respect to the bar 21 by means of the pin 22.

The cap 23 extends downwardly from the discharge end of the receptacle 10 and engages the periphery thereof, the lower end of the cap 23 engaging against a shoulder 24 carried by the receptacle 10. This inner cap 23 is held against rotation so that the apertures in the upper face thereof will be suitable for the contents to be discharged from the compartments within the receptacle 10. The outer cap generally designated as 25 engages about the inner cap 23, this outer cap 25 having an upper plate 26 which is adapted to close communication with one of the chambers in the receptacle 10 and permit discharge of the contents of the other chamber therein. This cap 25 has a discharge opening 27 therein through which the desired condiments are permitted to pass. The outer peripheral portion of the outer cap 25 is provided with a bead 28 which may be knurled or roughened so as to facilitate rotation of the outer cap 25 about the inner cap 23. The lower edge of the cylindrical portion 29 of the outer cap 25 is provided with a segmental recess 30 and the cylinder or receptacle 10 has an outstanding stop pin 31 which engages against either end of the recess 30 so as to limit the rotation of the outer cap 25 on the discharge end of the receptacle. When the outer cap is mounted on the inner cap, the peripheral portion of the outer cap is substantially flush with the peripheral portion of the cylinder 10.

It will be obvious from the foregoing that a relatively simple combination shaker has been devised which may be readily and cheaply manufactured and which is so constructed that the contents of the receptacle may be renewed or replaced without removing or disturbing the construction at the discharge end of the receptacle.

In the use of this device, the filler cap 19 may be removed from the filling end of the receptacle 10 and the closure 16 removed therefrom so as to permit the placement of the desired condiments in the several compartments within the receptacle 10. After the condiments have been placed in the receptacle, the closure 16 may be slipped over the lower end of the partition 13 and the cap 19 threadably mounted on the filling end of the receptacle 10. The inner face of the cap 19 will engage against one end of the spring 20 so as to yieldably hold the closure 16 against the lower end of the receptacle 10. When it is desired to remove a selected condiment from the receptacle 10, the outer cap 25 may be rotated so that the opening 27 therein will register with the openings in the inner cap 23 whereupon the shaker may be inverted and the desired condiments removed therefrom.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A condiment shaker comprising a receptacle, a partition dividing the receptacle into a plurality of chambers, means carried by one end of the receptacle for removing the contents from a selected chamber, an inner closure member on the opposite end of the receptacle, an outer closure disposed about said inner closure, and resilient means interposed between the inner and outer closures whereby to resiliently hold said inner closure against the end of the receptacle.

2. A condiment shaker comprising a cylindrical receptacle having open opposite end portions, a partition dividing the receptacle into a plurality of chambers, means carried by one end of the receptacle for removing the contents from a selected chamber, an inner closure member, means for removably mounting said inner closure member on one end of said partition, and an outer closure member threadably engaging said receptacle and engaging against said inner closure member whereby to hold said inner closure member in contact with the partition to prevent mixing of the contents of the receptacle.

In testimony whereof I hereunto affix my signature.

MILES C. T. LEWIS.